(12) United States Patent
Liang

(10) Patent No.: US 7,637,720 B1
(45) Date of Patent: Dec. 29, 2009

(54) TURBULATOR FOR A TURBINE AIRFOIL COOLING PASSAGE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 524 days.

(21) Appl. No.: 11/600,446

(22) Filed: Nov. 16, 2006

(51) Int. Cl.
*F01D 5/18* (2006.01)

(52) U.S. Cl. .................................. 416/96 R

(58) Field of Classification Search .............. 416/96 R, 416/97 R; 415/115; 165/109.1
See application file for complete search history.

(56) References Cited

U.S. PATENT DOCUMENTS

| | | | |
|---|---|---|---|
| 4,514,144 A | 4/1985 | Lee | |
| 5,361,828 A * | 11/1994 | Lee et al. | 165/109.1 |
| 5,423,608 A | 6/1995 | Chyou et al. | |
| 5,513,982 A | 5/1996 | Althaus et al. | |
| 5,681,144 A | 10/1997 | Spring et al. | |
| 5,695,320 A | 12/1997 | Kercher | |
| 5,695,321 A | 12/1997 | Kercher | |
| 5,700,132 A | 12/1997 | Lampes et al. | |
| 5,735,126 A * | 4/1998 | Schulte-Werning | 60/732 |
| 5,738,493 A | 4/1998 | Lee et al. | |
| 5,797,726 A * | 8/1998 | Lee | 416/96 R |
| 6,290,462 B1 | 9/2001 | Ishiguro et al. | |
| 6,331,098 B1 | 12/2001 | Lee | |
| 6,554,571 B1 | 4/2003 | Lee et al. | |
| 6,582,584 B2 | 6/2003 | Lee et al. | |
| 6,929,058 B2 * | 8/2005 | Liu et al. | 165/80.3 |
| 7,094,031 B2 | 8/2006 | Lee et al. | |

\* cited by examiner

*Primary Examiner*—Ninh H Nguyen
(74) *Attorney, Agent, or Firm*—John Ryznic

(57) ABSTRACT

A turbulator used in a turbine blade of a gas turbine engine, the turbulators arranged along a wall of the cooling air passage in an inverted V-shape with a diffusion slot between adjacent turbulators. The turbulators have a frontal surface and a top surface that are both substantially flat, and in which both have an increasing width and height in the direction from the passage side wall toward the slot. The turbulators have an end face forming the slot that is substantially flat, and because of the slanted angle of the adjacent turbulators forms the divergent opening or slot between adjacent end faces.

10 Claims, 3 Drawing Sheets

TURBULATOR FOR A TURBINE AIRFOIL COOLING PASSAGE

BACKGROUND OF THE INVENTION

1. Field of the Invention

The present invention relates generally to fluid reaction surfaces, and more specifically to a turbulator configuration within a turbine airfoil.

2. Description of the Related Art Including Information Disclosed Under 37 CFR 1.97 and 1.98

A gas turbine engine, such as an aircraft jet engine or an industrial gas turbine engine used for electric power production, include a turbine in which a plurality of stages of stator vanes and rotor blades are staggered along a hot gas flow path to extract mechanical energy and rotate the rotor shaft of the engine. The turbine vanes and blades in the forward stages of the turbine require complex cooling circuitry to provide air cooling for these airfoils in order to withstand the extremely high temperatures from the hot gas flow. It is well known that the engine efficiency can be increased by providing for a higher hot gas flow entering the turbine. However, the turbine airfoils' material properties limit the temperature at which these components can be exposed.

Providing more cooling air through these hot components could allow for a higher temperature of the hot gas flow. However, the cooling air used for the turbine airfoils is typically bled off from the compressor and therefore would be wasted. Reducing the amount of cooling air used from the compressor would also increase the efficiency of the engine. Thus, it is beneficial to provide for the turbine airfoil hot components to use a minimal amount of cooling air while providing for a maximum amount of cooling in order to maximize the efficiency of the engine.

A cooled turbine airfoil generally includes a plurality of passages formed within the airfoil in which the cooling air flows. Heat transfer from the hot airfoils walls to the cooling air is accomplished by convection and impingement cooling. In order to increase the heat transfer coefficient within the airfoil passage, turbulators ribs have been used to enhance the heat transfer coefficient along the inner surface of the airfoil passage by tripping or disrupting the cooling air boundary layer which is caused to separate from the internal surface and then reattach downstream from the rib. The heat transfer coefficient enhancement is conventionally defined as the convective heat transfer coefficient affected by the ribs divided by the convective heat transfer coefficient over a smooth surface without turbulator ribs, and has values ranging up to several times that of the latter.

Enhancement is conventionally related to the height or projection of the ribs into the internal passage, the distance between opposing walls of the internal passage, and the distance or spacing longitudinally between the ribs. The typical ratio of longitudinal spacing between turbulator ribs relative to rib height ranges from about 5.0 to about 10.0, and the ratio of the rib height to opposing wall distance has values of about 0.07 and up. And, exemplary turbulator ribs may include ribs disposed perpendicularly to the direction of cooling flow, ribs inclined relative to the direction of the cooling airflow, and ribs disposed on opposite walls of the internal passage that are longitudinally positioned either in-line or staggered with respect to each other.

Turbulator ribs provide localized increases in enhancement which decrease rapidly in value downstream from each individual rib. Accordingly, the ribs are typically uniform in configuration, uniform in height or projection into the internal passage, and uniform in longitudinal spacing there-between for obtaining a generally uniform, or average, enhancement along the surface of the blade cooled by the ribs.

The various conventional turbulator ribs result in different amounts of enhancement, along with pressure losses associated therewith. Since the ribs project into the internal passage and partially obstruct the free flow of the cooling air therethrough, they provide resistance to the flow of the cooling air which results in pressure losses. Although higher ribs generally increase enhancement, the pressure drop associated therewith also increases, which, therefore, typically requires an increase in supply pressure of the cooling airflow to offset the pressure losses. Accordingly, the effectiveness of turbulator ribs must be evaluated by their ability to provide effective enhancement without undesirable levels of pressure losses associated therewith.

The cooling passages within an airfoil typically have circular, rectangular, square or oblong transverse cross-sectional shapes. In a rotating turbine blade having a serpentine flow cooling circuit including longitudinally-oriented cooling passages of square cross-sectional shape, Coriolis (rotational) forces will increase the heat transfer coefficient along certain walls of the passage and decrease the heat transfer coefficient along other walls of the passage as compared to a non-rotating airfoil such as a stator vane. The Coriolis force compresses the cooling air against one side of the square passage, resulting in an increase in the heat transfer coefficient at that side while decreasing the heat transfer coefficient at the opposite side. This creates an uneven transverse cross section blade temperature profile which creates hot areas that must be compensated for by increasing the cooling air flow. Increasing the cooling air flow by bleeding off more compressed air from the compressor would decrease the engine efficiency.

FIG. 1 shows a cut-away view of a prior art convectively cooled turbine blade for a gas turbine engine. Turbulators are arranged along the three radial passages extending from the blade root to the blade tip. FIG. 2 shows a cross sectional view of the blade taken along the line shown in FIG. 1 with the three radial passages having turbulators formed along the pressure side wall and suction side wall of the passages. FIG. 3 shows a cross sectional view taken along the line shown in FIG. 1. this prior art cooling design scheme comprises conventional channel flow cooling that is augmented with long, skewed turbulators that are used for the blade leading edge, midchord section, and trailing edge. As the cooling air flows through the skewed turbulator, the leading edge of the turbulator (as indicated in FIGS. 3 and 4) trips the thermal boundary layer of the cooling fluid and subsequently augments the local heat transfer coefficient and thus enhances airfoil local cooling performance. As a result of this boundary layer tripping, vortices are generated and propagated along the turbulator from the leading edge to the trailing edge of the turbulator. As the vortices propagate along the full length of the turbulator, the boundary layer becomes progressively more distributed or thickened, and consequently the tripping of the boundary layer becomes progressively less effective. The net result of this boundary layer growth is significantly reduced heat transfer augmentation.

An alternative turbulator arrangement in the prior art is the Chevron formation shown in FIG. 5 which creates double leading edges for the turbulence promoter to increase the channel heat transfer enhancement. However, with this type of turbulence promoter arrangement, two thick boundary layers are generated at the junction of the turbulence promoters in the middle of the flow channel. The interaction of both vortices can be eliminated by segmenting the Chevron turbulator into two separated skew turbulators as represented in FIG. 6. The small opening between the two skewed turbulators allow for a small amount of the cooling air to blow through the slot and break up the vortices. Regardless of the turbulator arrangement, the thick boundary layer built-up by the vortices still reduce the tripping effect by the incoming cooling flow and thus reduce the heat transfer augmentation along the turbulator.

It is therefore an object of the present invention to provide for a turbine blade having an internal cooling air passage that has an improved heat transfer coefficient with reduced cooling air flow than those in the cited prior art references.

It is another object of the present invention to provide for a turbine blade with improved turbulator ribs for increasing the heat transfer coefficient.

It is another object of the present invention to provide for a turbulator rib that provides for an improved heat transfer coefficient that those of the cited prior art references.

BRIEF SUMMARY OF THE INVENTION

The reduction of heat transfer augmentation due to vortices in the cited prior art references can be eliminated with the turbulator having variable geometry of the present invention. The turbulator of the present invention is constructed with an increase in height and width along the length of the turbulator from the leading edge to the trailing edge. In addition, a divergent slot is formed at the junction of adjacent turbulators.

DETAILED DESCRIPTION OF THE INVENTION

The present invention is a turbine airfoil having an internal cooling air passage with turbulators (also called turbulence promoters) formed along the passage walls that increase the heat transfer coefficient from the hot wall to the cooling air passing through the passage. The present invention is also a turbulator geometry that can be used in any surface that uses a cooling fluid passing over a surface that uses convection for heat transfer.

Figure 1:
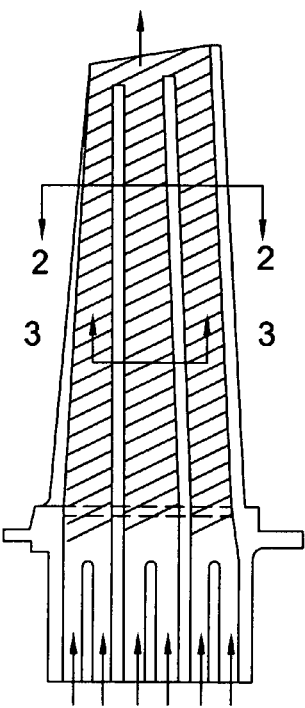
FIG. 1 shows a cut-away view of the side of a turbine blade of the prior art.
Figure 2:
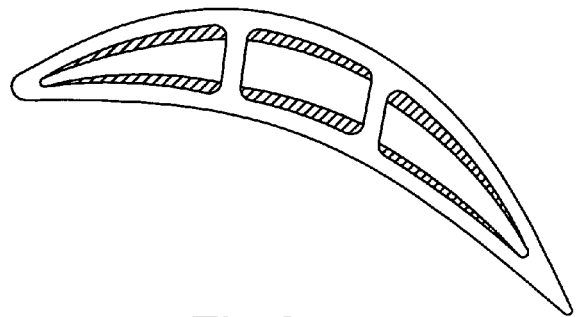
FIG. 2 shows a cross sectional top view of a section of the blade in FIG. 1.
Figure 3:
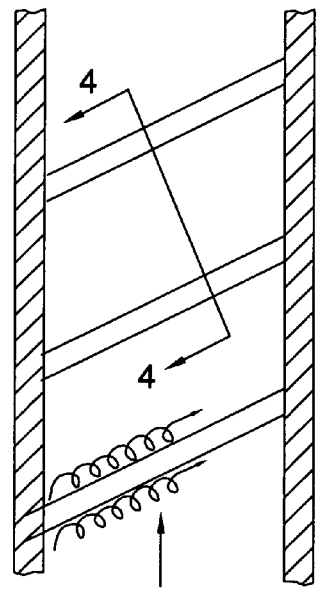
FIG. 3 shows a cross section side view of the turbulator passage from FIG. 1.
Figure 4:
FIG. 4 shows a cross section view of the turbulator from FIG. 3.
Figure 5:
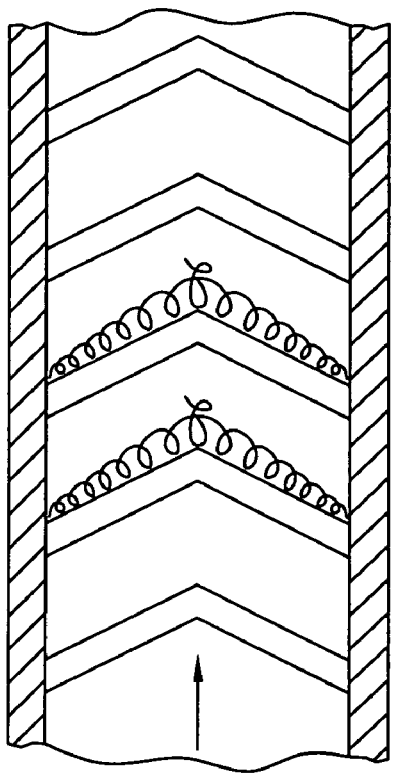
FIG. 5 shows a side view of a turbulator arrangement of the prior art.
Figure 6:
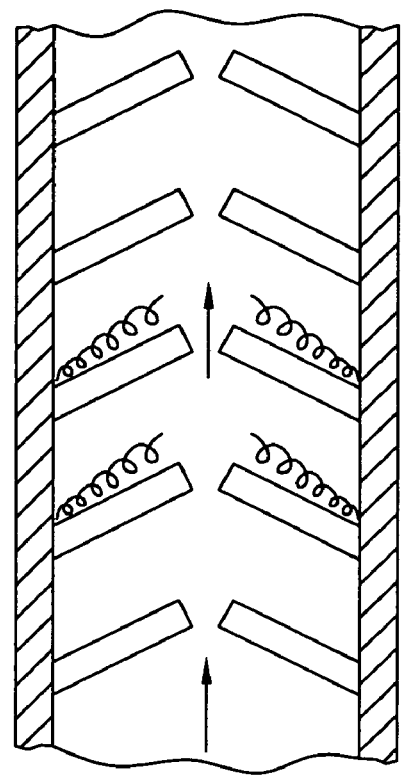
FIG. 6 shows a side view of another turbulator arrangement of the prior art.
Figure 7:
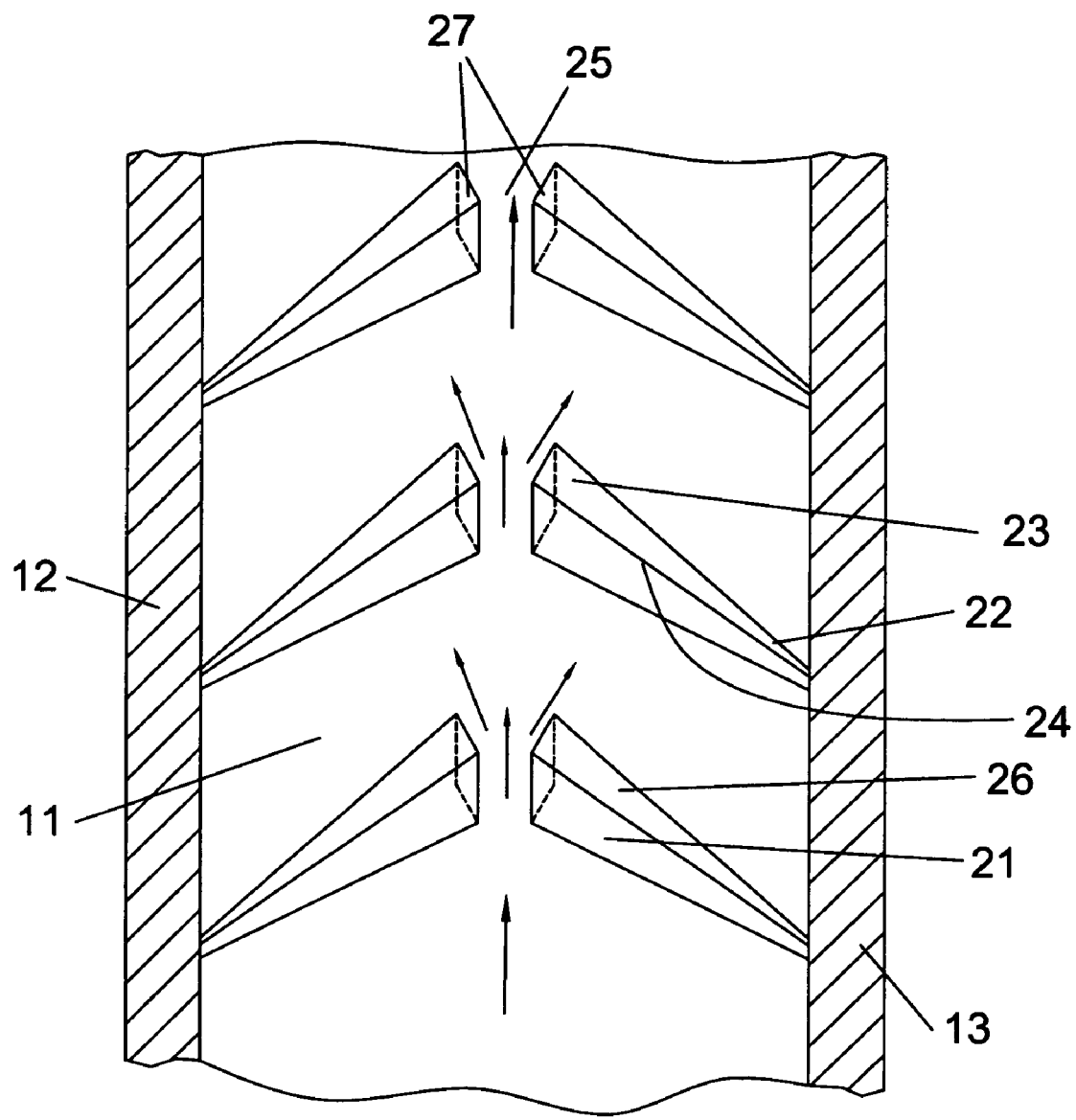
FIG. 7 shows a side view of a passage with the turbulators of the present invention.

A turbine airfoil, such as a rotor blade or a stator vane, includes cooling air passages therein to pass a cooling fluid such as air for cooling the airfoil. The invention is described for use in a turbine blade. However, the turbulators, or turbulence promoters, of the present invention could just as well be used in a stator vane. FIG. 7 shows a section of a side wall of a cooling air passage within the turbine airfoil. The turbulators form generally an inverted V-shape in the direction of the cooling air flow with an opening or slot at the point or tip of the V-shape. The slot is formed to be a diffusion slot in which the slot expands in the cooling air flow direction. The turbulator has a generally rectangular cross sectional shape (looking along the axial direction of the turbulator) with flat sides. The turbulator sides start out from the side wall of the passage with a small rectangular cross sectional shape, and increase in length in both the width and the height of the sides in the direction from the leading edge to the trailing edge of the turbulator. The leading edge is the upstream edge in the flow direction along the turbulator and is located at or near the side wall of the cooling air passage in which the turbulator functions. The ends of the turbulators are substantially flat and form a diffuser for the cooling air flowing through the opening or slot.

A wall 11 of the airfoil exposed to the hot gas flow is shown in FIG. 7 with side walls 12 and 13. The turbulators are formed along the wall 11 of the passage. The turbulator includes a frontal face 21 that faces the cooling air flow. The turbulator extends from the side walls with a leading edge 22 near to the side wall 12 and a trailing edge 23 on the opposite side of the turbulator. A frontal edge 24 is formed between the frontal face 21 and the top surface 26 of the turbulator. A divergent slot 25 is formed by two adjacent turbulator end faces 27. The end faces 27 are substantially flat, and due to the angled positioning of the turbulators in the inverted V-shape form the divergent slot 25 between the adjacent faces 27. The cooling Air flows in the direction of the arrow as seen in FIG. 7, which is from the bottom of the figure to the top. Two adjacent turbulators in the passage 11 that form the diffuser 25 are substantially symmetric with each other.

In operation, the cooling flow tripped at the leading edge of the turbulator thus creates a vortex and roll along the length of the turbulator. However, this newly formed vortex will be pushed away from the frontal edge of the turbulence promoter by the increasing width and height of the turbulator. This new turbulator geometry eliminates the interaction of the vortices between the old vortices and the newly formed vortices by the incoming cooling flow along the turbulator and thus creates a much effective way of tripping the boundary layer and induces a much higher heat transfer coefficient.

In addition, the divergent slot located between two adjacent variable geometry turbulators allow the cooling air flow to channel through the opening, and thus generates a new boundary layer. With this newly formed boundary layer created by the divergent slot, a shearing-off action of the vortices generated by the turbulator occurs. Subsequently, this results in an undisturbed boundary layer for the middle portion of the cooling flow channel.

The turbulator arrangement of the present invention creates a fresh frontal edge for the turbulator, and thus generates a high rate of internal convective heat transfer coefficient and attendant improvement in overall cooling performance. With an improved cooling of the airfoil, a reduction in cooling flow is accomplished and increased turbine engine efficiency is obtained.

I claim:

1. A turbine airfoil for use in a gas turbine engine, the airfoil including an internal cooling air passage with a plurality of turbulators arranged along the passage wall, the airfoil comprising:

the turbulator extending along the passage wall and having an increasing width and an increasing height; and the turbulator having substantially a rectangular cross section shape.

2. The turbine airfoil of claim 1, and further comprising:

the turbulator having a frontal face with substantially a flat surface and a top face that is substantially a flat surface.

3. A turbine airfoil for use in a gas turbine engine, the airfoil including an internal cooling air passage with a plurality of turbulators arranged along the passage wall, the airfoil comprising:

the turbulators forming an inverted V-shape in the direction of the cooling air flow;

a slot formed between adjacent turbulators in which the slot forms a diffuser for the passage of the cooling air; and, the turbulators extending along the passage wall have an increasing width and an increasing height in a direction from the leading edge to the trailing edge of the turbulator.

4. The turbine airfoil of claim 3, and further comprising:
the turbulators each has a frontal face with substantially a flat surface and a top face that is substantially a flat surface.

5. The turbine airfoil of claim 3, and further comprising:
the slot is formed by substantially flat faces on the ends of adjacent turbulators.

6. A turbine airfoil for use in a gas turbine engine, the airfoil including an internal cooling air passage with a plurality of turbulators arranged along the passage wall, the airfoil comprising:

the turbulators forming an inverted V-shape in the direction of the cooling air flow;

a slot formed between adjacent turbulators in which the slot forms a diffuser for the passage of the cooling air; and, the turbulator having substantially a rectangular cross section shape.

7. A turbulator for use in a turbine airfoil of a gas turbine engine, the airfoil having an internal cooling air passage in which the turbulators are arranged along a wall of the passage, the turbulator comprising:

two turbulators arranged to form an inverted V-shape in a direction of fluid flow over the turbulators;

a slot formed between the two adjacent turbulators; and, the turbulators having an increasing width and an increasing height in the direction from the leading edge to the trailing edge of the turbulator.

8. The turbulator of claim 7, and further comprising:
the slot is a diverging slot that forms a diffuser.

9. The turbulator of claim 7, and further comprising:
the turbulators have a frontal face and a top face that are both substantially flat.

10. The turbulator of claim 7, and further comprising:
the turbulators have an end face that is substantially flat and forms the diffuser.

* * * * *